Dec. 1, 1970   LE ROY V. RUSTEN   3,544,156
SHUTTERED ROOF FOR TRUCKS, TRAILERS AND THE LIKE
Filed Feb. 17, 1969
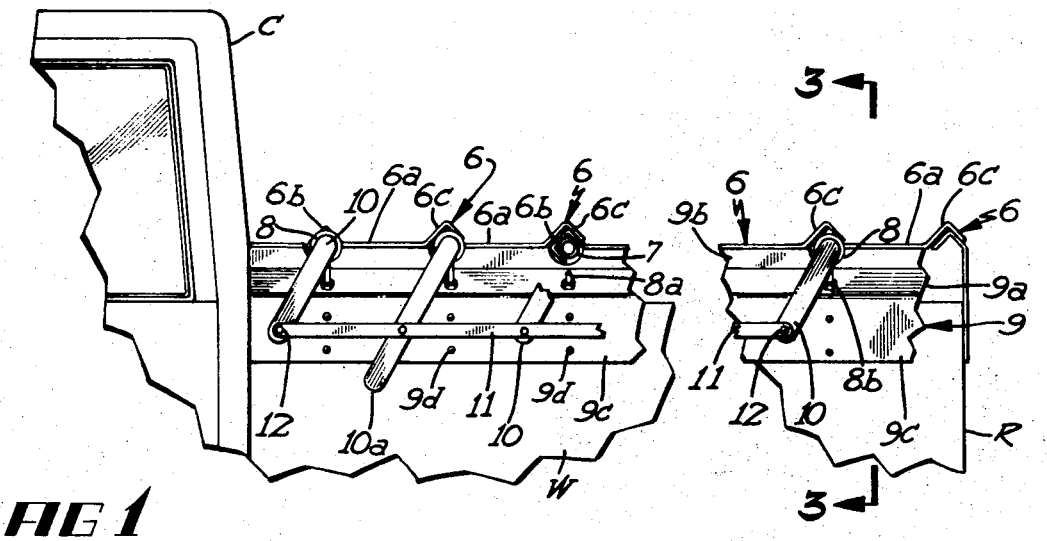
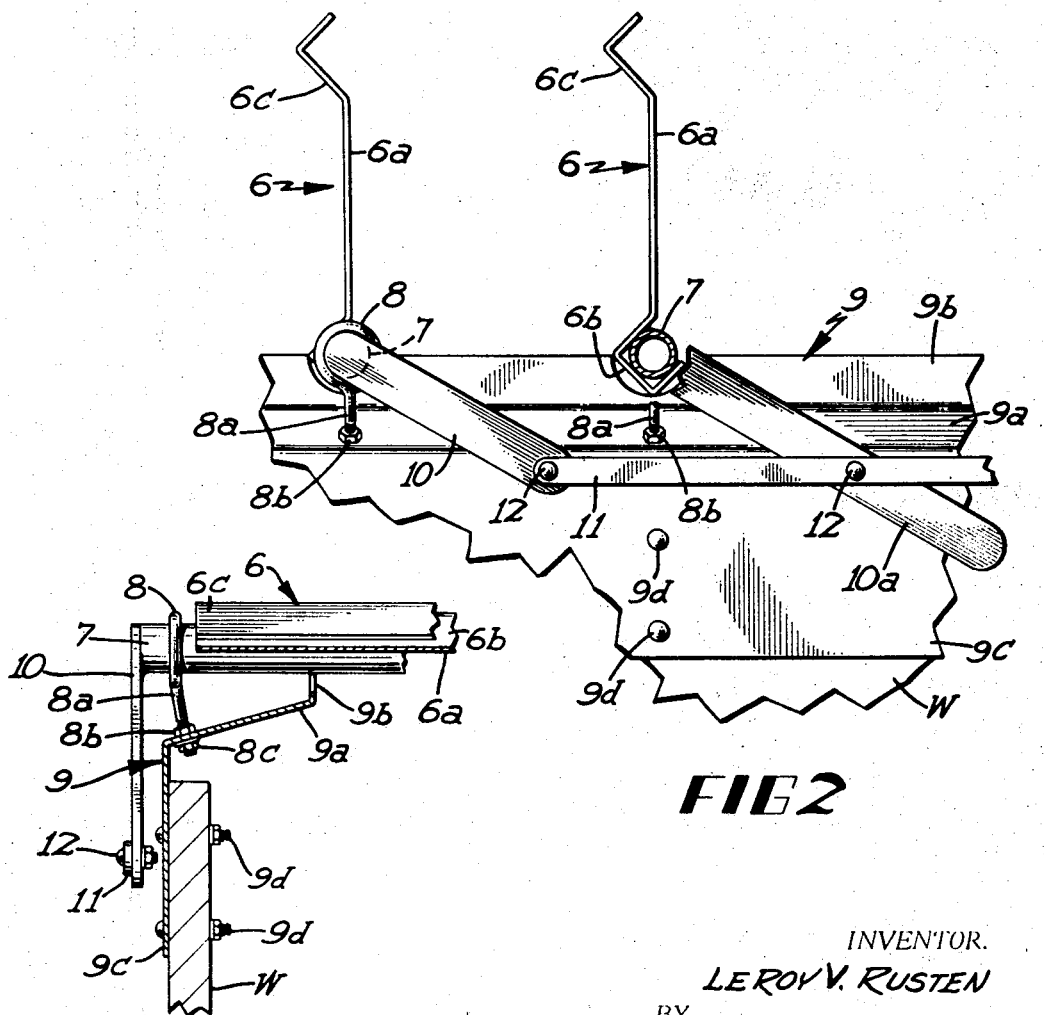
INVENTOR.
LE ROY V. RUSTEN
BY
Williamson, Palmatier
& Bains
ATTORNEYS United States Patent Office 3,544,156
Patented Dec. 1, 1970

1

3,544,156
SHUTTERED ROOF FOR TRUCKS, TRAILERS
AND THE LIKE
Le Roy V. Rusten, 220 S. 15th St.,
Moorhead, Minn. 56560
Filed Feb. 17, 1969, Ser. No. 799,728
Int. Cl. B60j 7/10
U.S. Cl. 296—137                                    6 Claims

ABSTRACT OF THE DISCLOSURE

A shuttered roof or top for the bodies of transport vehicles, to exclude rain, snow, dust and wind from the contents of said vehicles, and to further facilitate the loading of the bodies with particulate materials having a plurality of swingable shutters mounted transversely across the top of the transport vehicle body in normally overlapping relation with sealed effect. Each of the shutter members extend somewhat beyond the side walls of the transport body and has at the two ends thereof, coaxial means for swingably interconnecting the shutter with the respective upper side walls of the body. Actuating mechanism is provided for swinging all of said shutters simultaneously to and from overlapping shuttered positions.

---

This invention relates to protective roofs or tops for truck bodies, trailers and other hauling vehicles which will positively exclude rain, snow and wind from the interior of the vehicle body.

The invention has particular pertinency to trucks, trailers and other transport vehicles, which are customarily or for substantial periods of time, employed in the hauling of the various grains and feedstuffs as well as fresh corn and other vegetables.

At the present time canvas or other flexible tarpaulins are generally employed to cover the contents of a truck or trailer body, being attached at spaced intervals by suitable straps, ropes or the like. Even if they are stretched across the contents at the top of the vehicle body and attached at intervals thereto, such covers or tarpaulins are entirely inadequate to prevent rain, snow and dust from entering the body of the transport vehicle and thereby damaging the grain, vegetables or other materials in transport.

In travel, strong gusts of winds as in passing other vehicles or heavy winds and wear will distort the position of the tarpaulin, often resulting in severing of the straps or attachment cords.

It is an important object of my invention to provide simple and highly efficient swingable shutter roofs which will positively exclude rain, snow, dust and wind when in closed or protected position, and which may be readily manipulated to provide wide spaced openings in the top, through which grain, corn on the cob, vegetables and feedstuffs may be readily poured or dropped into the transport body.

More specifically it is an object to provide a protective roof or top for transport vehicle bodies which may be readily attached in operative position to the vertical walls of the body and which essentially comprises a plurality of transversely disposed, overlying shutters related in overlying relation to positively prevent rain or moisture from entering the vehicle body, together with operating mechanism whereby through swinging of a lever at either side of the vehicle, all shutters may be simultaneously opened for loading of granular or particulate material, and may be simultaneously closed and sealed.

My invention, in its preferred form also includes for at least the longitudinal sides of the vertical body, shoulders or eaves which mount and support the controllable shutter mechanism to further prevent seepage of moisture or foreign material to the contents of the vehicle body.

The foregoing objects and purposes of the invention will be more apparent from the following description made in connection with the accompanying drawings, wherein like refernece characters refer to similar parts throughout the several views, and in which:

FIG. 1 is a view mainly in side elevation with some portions broken away and some parts being shown in section, illustrating an embodiment of my invention applied as a protective roof to the upper portions of the body of a transport vehicle such as a truck;

FIG. 2 is a similar fragmentary view showing two of the normally overlapping protective shutters swung upwardly for receiving a load of particulate material which may vary widely in size and particle shape, including such materials as grain, feedstuffs, corn on the cob and vegetables;

FIG. 3 is a vertical cross section taken on the line 3—3 of FIG. 1.

Referring now in detail to the accompanying drawings an embodiment of my invention is shown attached to the upper portion, and particularly the upstanding vertical side walls W of a conventional truck, and in closed position protects and covers the entire top of the truck body from the cab C to and over the end gate E of the body.

The protective roof itself consists in a plurality or multiplicity of transversely disposed, overlapping shutter members 6, having reältively wide, substantially planar intermediate areas 6a, and having at their leading edges (with respect to direction of travel) upwardly angled ridge forming portions 6b which are rigidly attached at both ends thereof to stub shafts which extend outwardly and horizontally some distance beyond the outer surfaces of the side walls W of the vehicle body. The shutters 6 at the opposite longitudinal edges are also upwardly angled longitudinally to constitute ridge forming and reinforcing portions 6c (trailing edges), which overlap and seat against the forward angled leading edges of the adjacent shutters when the shutters are swung to closed protective position, as shown in FIG. 1.

The numerous shutters 6 are preferably integrally formed from relatively rigid material such as galvanized steel of about 14 gauge, the angled formations of the longitudinal portions of the sheet metal adding rigidity to the overall structure, and furthermore forming upstanding ridges when the shutters are closed, which causes falling rain or snow to be promptly distributed to the central planar portions of the respective shutters. Preferably the axes of the respective shutters are inclined slightly from the horizontal from one longitudinal side of the body to the other to assure drainage of heavy rain at one side of the transport vehicle.

The stub shafts or trunnions of the respective shutters are journaled in suitable bearing members 8, which in the form shown comprise heavy annular members integrally formed with or secured to depending shanks 8a which are interconnected with the upper portion of the side walls of the transport vehicle body.

In the preferred form of my invention, I provide for each longitudinal side of the vehicle body, inwardly extending and overhanging elongate eave sections indicated as an entirety by the numeral 9, which have integrally formed, inwardly extending and somewhat inclined longitudinal decks 9a terminating in upwardly extending flanges 9b which terminate in horizontal edges disposed just below and substantially inward of the ends of the plurality of shutter members 6. The longitudinal eave sections 9, as shown, have integral depending and vertical attachment flanges 9c which at intervals may be attached by bolts or other fastening means to the upstanding side walls W of the transport body.

In the form illustrated, the bearing members 8 for the stub shafts 7 of the shutters are indirectly supported from the longitudinal side walls of the vehicle body through the intermediary of the elongate eave members 9. As shown, the shanks 8a of the bearing members are externally threaded and rigidly secured at points adjacent to the attachment flange 9c by a pair of clamping bolts 8b and 8c engaging against the inwardly extended flanges 9a and threaded upon the lower ends of shank 8a.

The journaled stub shafts or trunnions 7, at both longitudinal sides of the vehicle body, constitute rock shafts and all have attached thereto rigid rocker arms 10, all arranged in parallel relation and preferably depending rather than extending upwardly. To interconnect the rocker shafts 10 at each of the longitudinal sides of the vehicle for swinging in unison and consequently, operating the shutters in parallel relationship, I provide preferably at each side of the vehicle, a substantially horizontal, elongate, interconnecting bar 11 pivotally connected as by nutted bolts 12 with the outer portions of the rocker arms 10. Said interconnecting bar is disposed in parallel relation with a line passing through the axes of the stub shafts or trunnions 7 at the corresponding longitudinal side of the vehicle. Thus, torque forcefully applied to any one of the stub shafts 7 through rocker arm interconnection will simultaneously partially rotate all of the stub shafts and simultaneously swing the shutters to and from closed overlapping position to an upstanding position of the shutters, as illustrated in FIG. 2, where the shutters are spaced apart widely in a position to define large longitudinal openings through which material such as grain, feedstuffs, vegetables, including corn on the cob or other relatively large particulate material may be dropped or loaded into the transport body.

Preferably, at each of the longitudinal sides of the vehicle, one of the intermediate rocker arms 10 is substantially extended to form a rigidly mounted operating arm, giving increased leverage which is identified is 10a in the drawings.

OPERATION

In loading the body of the transport vehicle the rigid lever extension arm 10a at one or the other sides of the vehicle is forcibly swung in counter-clockwise direction through an arc approximating 90°, which will cause all of the shutters through the rocker arms and parallelogram relation with the interconnecting bar 11, to assume the upstanding, almost vertical position shown in FIG. 2. Large transverse spaces are thereby provided at the top of the body through which even relatively large particulate material may be dropped or spouted, and the body may be thus loaded to the requisite height. The structure is particularly adapted for loading of numerous grains, feedstuffs, green corn and other vegetables as well as chemicals, fuels and the like in granular or particulate form.

After loading, the vehicle driver or attendant merely swings one of the operating arm extensions 10a in the opposite or clockwise direction through approximately a 90° arc thereupon all of the shutters, through the simple and efficient actuating connections, are brought to the substantially horizontal, overlapping positions shown in FIG. 1. It will be noted that in the closed, protective position of the roof, the upstanding ridge-like leading edges of all but the foremost shutters on the body, are covered and sealed by the upstanding ridge edges at the trailing edge of the next foreward shutter. Such structure and relationship not only strengthens the construction of the individual shutters, but positively prevents strong wind from wedging or entering between the shutters when the loader transport vehicles are in travel. Furthermore the provision of such overlapping ridges causes rain and snow to be immediately deflected downwardly to the large planar areas intermediate of the shutters, which constitute gutters slightly inclining transversely to one side of the vehicle for drainage of water.

It will be understood that the longitudinal ridges 6b and 6c may be curved or arcuate cross sectional shape as well as of the angular shape illustrated.

While the elongate eave and shoulder sections 9 are not requisite to the practicing of my invention it is preferable to employ such structures at the two longitudinal sides of the vehicle body with the vertical, depending flanges 9c rigidly affixed to the upstanding side walls of the transport body, and with the mildly inclined wide eave flanges 9a substantially underlying the end portions of the numerous shutters. The upturned, terminal longitudinal edges 9b of the eave and shoulder sections lie in close relation to the underside of the shutters when closed. Thus, in closed position the roof is substantially in a sealed relation with the walls of the transport vehicle body and will positively exclude rain, snow, dust and dirt from the interior of the transport body.

It will of course be understood that various changes in the details, equivalent elements, etc., may be made, which are within the scope of the appended claims, all of which are within the scope of my invention.

What is claimed is:

1. A shuttered roof or top for the bodies of transport vehicles such as trucks and trailers, having in combination, a plurality of swingable shutter members mounted transversely across the top of a transport vehicle body in normally overlapping relation, each of said shutter members having adjacent the two ends thereof, coaxial means for swingably mounting and interconnecting the shutter with the respective upper side walls of the transport body, rocker arms for all of said shutter members extending substantially perpendicularly to said last mentioned means and all extending in a parallel relation at the adjacent side wall of the transport body, a common elongate, interconnecting member extending normal to a line parallel with the axes of said several shutters at one side of the transport body and pivotally connected with the outer portions of all of said rocker arms on said side, whereby through application of torque force adjacent the end of one of said rocker arms, all of said shutters are simultaneously swung to and from substantially horizontal shuttered position and to and from an upstanding parallel position for loading said body.

2. The structure and combination as set forth in claim 1 wherein said means for swingably interconnecting said shutters comprise shaft elements affixed to said shutters longitudinally thereof and extending at least at one side of said vehicle, beyond journal means therefor supported from the side walls of the transport body, said rocker arms being affixed to the extending end portions of said shaft elements in parallel relation at one side of said transport body, and said shutter members being rigidly interconnected with said shaft elements adjacent the leading edges thereof.

3. The structure and combination as set forth in claim 1 where each of said shutters has a leading edge relative to travel of the transport vehicle providing an upstanding longitudinal ridge and a longitudinal trailing edge of inverted channel shape covering and engaging the longitudinal ridge of the adjacent rearward shutter when the shutters are swung to closed protective position.

4. The structure and combination as set forth in claim 1 and an elongate shoulder structure attached to and extending above each of the upstanding longitudinal sides of the vehicle body, said shoulder structures having continuous longitudinal flanges extending inwardly through lines underlying the end portions of said shutters and inclined somewhat upwardly from their outside portions to their inner edges.

5. The structure set forth in preceding claim 4 further characterized by,
said shutters being swingably mounted on axes disposed below the forward edges thereof, and said elongate shoulder structures terminating at inner upturned straight edges disposed in very close relation to the bottom of said shutters when said shutters are swung to closed position.

6. The structure and combination as set forth in claim 1 wherein said coaxial means comprises a pair of coaxial trunnions affixed to the opposite ends of each shutter and an upstanding bearing for journaling each of said trunnions, said bearings being connected with and supported by the side walls of said transport body.

References Cited
UNITED STATES PATENTS

| | | | |
|---|---|---|---|
| 2,210,869 | 8/1940 | Larson | 49—74 |
| 3,416,835 | 12/1968 | Ohle | 296—100 |

LEO FRIAGLIA, Primary Examiner

R. R. SONG, Assistant Examiner

U.S. Cl. X.R.

296—100; 49—92